United States Patent
Yu et al.

(10) Patent No.: US 8,357,324 B2
(45) Date of Patent: Jan. 22, 2013

(54) ROTOMOLDING PROCESS FOR POLYETHYLENE ARTICLES

(75) Inventors: Jiong Yu, Congers, NY (US); John Sigler, Newburgh, NY (US); Eric Wallis, The Woodlands, TX (US)

(73) Assignee: BASF SE, Ludwigshafen (DE)

( * ) Notice: Subject to any disclaimer, the term of this patent is extended or adjusted under 35 U.S.C. 154(b) by 183 days.

(21) Appl. No.: 12/762,847

(22) Filed: Apr. 19, 2010

(65) Prior Publication Data

US 2010/0327487 A1 Dec. 30, 2010

Related U.S. Application Data

(60) Provisional application No. 61/214,236, filed on Apr. 21, 2009.

(51) Int. Cl.
B28B 1/02 (2006.01)

(52) U.S. Cl. .......... 264/310; 264/312; 524/99; 524/117; 524/118; 524/119; 524/120; 524/129; 252/400.2; 252/401; 252/405

(58) Field of Classification Search .......... 524/99, 524/118, 119, 117, 120, 129; 252/400.2, 252/401, 405; 264/310, 312
See application file for complete search history.

(56) References Cited

U.S. PATENT DOCUMENTS

| | | | |
|---|---|---|---|
| 5,300,647 A * | 4/1994 | Malherbe et al. | 546/188 |
| 6,444,733 B1 | 9/2002 | Stadler | |
| 7,030,196 B2 | 4/2006 | Roth et al. | |

* cited by examiner

*Primary Examiner* — Peter D Mulcahy
(74) *Attorney, Agent, or Firm* — Tyler A Stevenson

(57) ABSTRACT

The present invention relates to a process for the production of polyethylene hollow articles, which process comprises charging the polyethylene with one or more NO-acyl hindered amine additives containing one or more groups of formula (I), filling this mixture into a mold, heating this mold in an oven to above 280° C., such that the additized polyethylene melts, rotating the mold around at least 2 axes, the additized polyethylene spreading to the walls, cooling the mold while still rotating, opening it, and taking the resultant hollow article out, where the group of formula (I) is

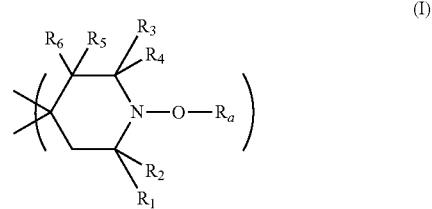

where
$R_a$ is a monoacyl or diacyl radical;
$R_1$-$R_4$ are each $C_1$-$C_6$alkyl; and
$R_5$ and $R_6$ are each, independently of one another, hydrogen, $C_1$-$C_6$alkyl or $C_6$-$C_{10}$aryl; or
$R_5$ and $R_6$ are together oxygen.

19 Claims, No Drawings

ROTOMOLDING PROCESS FOR POLYETHYLENE ARTICLES

This application claims benefit of U.S. provisional app. No. 61/214,236, filed Apr. 21, 2009, the contents of which are incorporated by reference.

The present invention relates to the production of polyethylene hollow articles by the rotomolding (rotational molding) process. The process employs certain NO-acyl hindered amine additives. The NO-acyl hindered amines are also termed hindered hydroxylamine esters.

The rotomolding or rotational molding/casting process is used for the production of fairly large plastic hollow articles which may be reinforced with glass fibres (Encyclopedia of Polymer Science and Engineering, Wiley Interscience, 1988, Vol. 14, pages 659-670). In principle, this process is carried out as follows: The plastic material is filled into one half of the mold which is then closed with the other half and heated in an oven such that the molten plastic material spreads to the walls of the mold when rotated around different axes. The hollow article is obtained after cooling. In this manner it is possible to produce, for example, storage and truck tanks from HD polyethylene. The process normally requires temperatures in the range above 300° C., sometimes even above 400° C. The requirements placed on the stabilizers are therefore different from and more stringent than those, for example, of the extrusion process where the temperatures are normally not much above 280° C.

U.S. Pat. No. 6,444,733 describes the rotomolding process for polyolefins.

U.S. Pat. No. 7,030,196 describes a method for increasing the molecular weight of polyethylene.

U.S. Patents discussed herein are each, incorporated by reference.

It has now been found that the use of certain NO-acyl hindered amine compounds results in excellent performance in the rotomolding process for polyethylene. The hollow articles prepared according to the present invention exhibit excellent initial color and gas fading resistance. The use of the present additives provides for reduced cycle time and provides polyethylene articles with improved impact performance.

SUMMARY

The present invention relates to a process for the production of polyethylene hollow articles, which process comprises charging the polyethylene with one or more NO-acyl hindered amine additives containing one or more groups of formula (I), filling this mixture into a mold, heating this mold in an oven to above 280° C., such that the additized polyethylene melts, rotating the mold around at least 2 axes, the additized polyethylene spreading to the walls, cooling the mold while still rotating, opening it, and taking the resultant hollow article out, where the group of formula (I) is

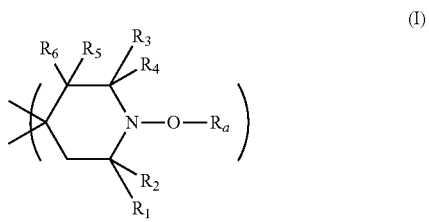

where
$R_a$ is a monoacyl or diacyl radical;
$R_1$-$R_4$ are each $C_1$-$C_6$alkyl; and
$R_5$ and $R_6$ are each, independently of one another, hydrogen, $C_1$-$C_6$alkyl or $C_6$-$C_{10}$aryl; or
$R_5$ and $R_6$ are together oxygen.

DETAILED DISCLOSURE

Preference is given to the process using NO-acyl compounds containing groups of formula (I), in which $R_a$ is $C_2$-$C_{18}$alkanoyl or $C_3$-$C_6$alkenoyl.

A monoacyl radical $R_a$ may be, for example, the acyl radical derived from a monobasic organic acid comprising C radicals and an acid function, e.g. acyl radicals of formulae —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl or —C(=O)—N($C_1$-$C_6$alkyl)$_2$.

When $R_a$ is a monoacyl radical, the NO-acyl compounds are monomeric or dimeric structures. Thus, dimeric structures have suitable bivalent substituents in the 4-position and these are in turn substituted in the terminal position by groups (I) via their 4-position (α,ω-substitution).

The term NO-acyl compounds encompasses both monomeric and oligomeric compounds and also polymers formed by groups of the formula I.

A diacyl radical $R_a$ may be, for example, the diacyl radical derived from a monobasic organic acid having C radicals and two acid functions, e.g. a diacyl radical derived from an aliphatic, aromatic or cycloaliphatic dicarboxylic acid.

Suitable aliphatic dicarboxylic acids have from 2 to 40 C-atoms, e.g. oxalic acid, malonic acid, dimethylmalonic acid, succinic acid, pimelic acid, adipic acid, trimethyladipic acid, sebacic acid, azelaic acid and dimeric acid (dimerization products of unsaturated aliphatic carboxylic acids such as oleic acid), alkylated malonic and succinic acids, e.g. octadecylsuccinic acid. Suitable cycloaliphatic dicarboxylic acids are, for example, 1,3-cyclobutanedicarboxylic acid, 1,3-cyclopentanedicarboxylic acid, 1,3- and 1,4-cyclohexanedicarboxylic acid, 1,3- and 1,4-(di-carboxymethyl)cyclohexane or 4,4'-dicyclohexyldicarboxylic acid.

Suitable aromatic dicarboxylic acids are, for example, terephthalic acid, isophthalic acid, o-phthalic acid, and also 1,3-, 1,4-, 2,6- or 2,7-naphthalenedicarboxylic acid, 4,4'-biphenyldicarboxylic acid, bis(4-carboxyphenyl)sulfone, 4,4'-benzophenonedicarboxylic acid, 1,1,3-trimethyl-5-carboxy-3-(p-carboxyphenyl)indane, bis(4-carboxyphenyl)ether, bis(p-carboxyphenyl)methane or bis(p-carboxyphenyl)ethane.

Preference is given to aromatic dicarboxylic acids, in particular terephthalic acid, isophthalic acid and 2,6-naphthalenedicarboxylic acid.

Further suitable dicarboxylic acids are ones containing —CO—NH— groups. These are described in U.S. Pat. No. 4,002,600. Also suitable are dicarboxylic acids containing N-heterocyclic rings, e.g. those derived from carboxyalkylated, carboxyphenylated or carboxylbenzylated monoamine-s-triazinedicarboxylic acids (cf. U.S. Pat. Nos. 3,697,520 and 4,034,019), monohydantoins or bishydantoins, halogenated or unhalogenated benzimidazoles or parabanic acid. The carboxyalkyl groups may contain from 3 to 20 C-atoms.

When $R_a$ is a diacyl radical and a suitable functional group, e.g. hydroxy or amino, is present in the 4-position, compounds of the formula I are polymeric structures, e.g. polyesters, polyesteramides, polyurethanes, polycarbonates or polyimide esters.

In particular, the present NO-acyl hindered amines are of the formula (IC) of U.S. Pat. No. 7,030,196, incorporated by reference. Such compounds are of the formula:

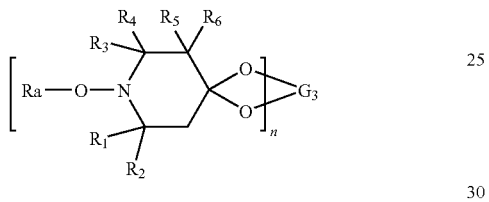

where n is 1 or 2, $R_a$ is —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl or —C(=O)—N($C_1$-$C_6$alkyl)$_2$, $R_1$-$R_4$ are each $C_1$-$C_6$alkyl;

$R_5$ and $R_6$ are each, independently of one another, hydrogen, $C_1$-$C_6$alkyl or $C_6$-$C_{10}$aryl; or $R_5$ and $R_6$ are together oxygen; and $G_3$ is $C_2$-$C_8$alkylene, $C_2$-$C_8$hydroxyalkylene or $C_4$-$C_{30}$acyloxyalkylene when n=1 or is the group (—CH$_2$)$_2$C(CH$_2$—)$_2$ when n=2.

Specific NO-acyl hindered amines are for instance of the formulae (1)-(9):

(1)
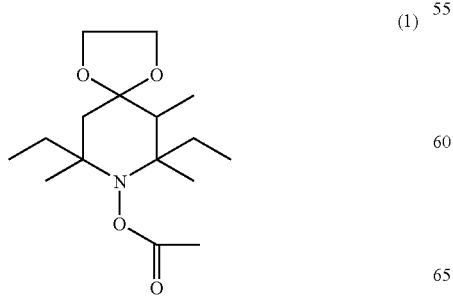

(2)
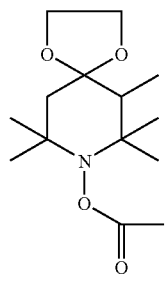

(3)
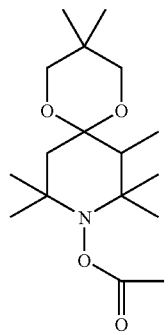

(4)
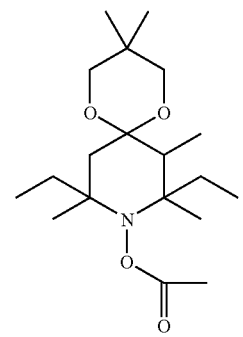

(5)
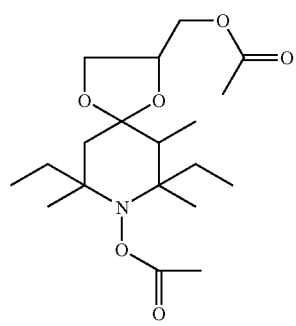

(6)
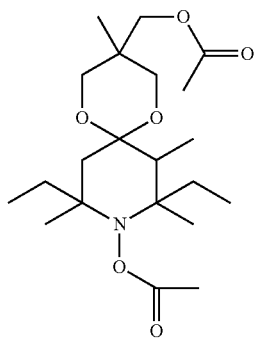

(7)

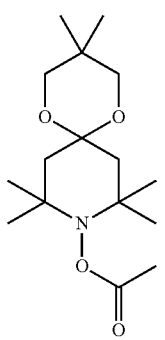

(8)

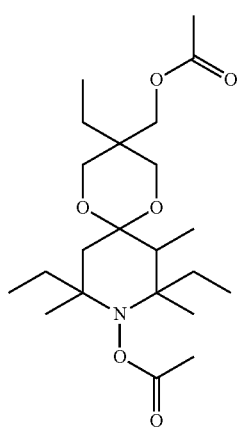

(9)

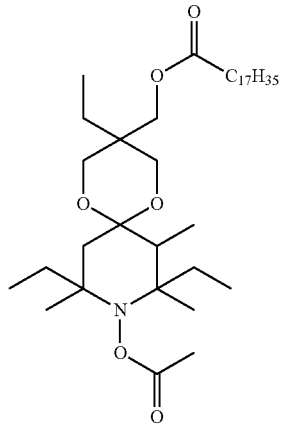

Alkyl is straight or branched and is for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

Alkenyl is unsaturated alkyl, for instance allyl.

Aryl is for instance phenyl or napthyl. Aryl may be substituted, for instance mono- or di-substituted by suitable substituents, e.g. $C_1$-$C_4$alkyl, e.g. methyl, ethyl or tert-butyl, $C_1$-$C_4$alkoxy, e.g. methoxy or ethoxy, or halogen, e.g. chlorine.

In the present process for rotomolding polyethylenes, the NO-acyl hindered amines are present in concentrations of from about 0.01 to about 10.0% by weight, in particular from about 0.1 to about 5.0% by weight, preferably from about 0.2 to about 3.0% by weight and preferably from about 0.1 to about 2.0% by weight, based on the amount of polyethylene. The weight level of the NO-acyl hindered amines is for example about 0.1, 0.2, 0.3, 0.4, 0.5 or about 1.0 weight percent. Ranges within these levels are also disclosed.

Suitable polymers of the polyethylene type are, for example, high density polyethylene (HDPE), high molecular weight high density polyethylene (HMW HDPE), ultrahigh molecular weight high density polyethylene (UHMW HDPE), medium density polyethylene (MDPE), low density polyethylene (LDPE), linear low density polyethylene (LLDPE), branched low density polyethylene (BLDPE) or polyethylenes and ethylene copolymers prepared using Phillips catalysts and polyethylene blends. Ethylene copolymers can in this case contain differing proportions of comonomers. Examples which may be mentioned are: 1-olefins such as propene, 1-butene, 1-pentene, 1-hexene, 1-heptene, 1-octene or isobutylene, styrene, cycloolefins such as cyclopentene, cyclohexene or norbornene or dienes such as butadiene, isoprene, 1,4-hexadiene, cyclopentadiene, dicyclopentadiene, norbornadiene or ethylidenenorbornene.

Polyethylene also included polyethylene blends. These are mixtures of polyethylenes with polyolefins. Examples are mixtures with polypropylene (PP), mixtures with various PE types, for example with: high density polyethylene (HDPE), high molecular weight high density polyethylene (HMW HDPE), ultrahigh molecular weight high density polyethylene (UHMW HDPE), medium density polyethylene (MDPE), low density polyethylene (LDPE), linear low density polyethylene (LLDPE), branched low density polyethylene (BLDPE) and, in particular, ethylene-propylene-diene terpolymers (EPDM) containing high proportions of diene.

Further additives may be present in the polyethylene of the invention. For instance, ultraviolet light absorbers selected from hydroxyphenylbenzotriazole, hydroxyphenyltriazine, benzophenone and benzoate UV absorbers, organic phosphorus stabilizers, hydroxylamine stabilizers, benzofuranone stabilizers, amine oxide stabilizers, hindered phenol antioxidants and/or further hindered amine stabilizers. The further additives are for instance employed at levels of about 0.1 to about 10% by weight, based on the weight of the polyethylene.

In particular, further additives are selected from the organic phosphorus stabilizers, hindered phenol antioxidants, hydroxylamines, hindered amines and benzoate UV absorbers.

The organic phosphorus stabilizers are for example known phosphite and phosphonite stabilizers and include triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, bis(2,4-di-α-cumylphenyl)pentaerythritol diphosphite, diisodecyl pentaerythritol diphosphite, bis(2,4-di-tert-butylphenyl)pentaerythritol diphosphite (D), bis(2,6-di-tert-butyl-4-methylphenyl)pentaerythritol diphosphite (E), bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphate, tetrakis(2,4-di-tert-butylphenyl)4,4'-biphenylene-diphosphonite (H), 6-isooctyloxy-2,4,8,10-tetra-tertbutyl-dibenzo[d,f][1,3,2]dioxaphosphepin (C), 6-fluoro-2,4,8,10-tetra-tert-butyl-12-methyl-dibenzo[d,g][1,3,2]dioxaphosphocin (A), bis(2,4-di-tert-butyl-6-methylphenyl) methyl phosphite, bis(2,4-di-tert-butyl-6-methylphenyl) ethyl phosphite (G), 2,2',2''-nitrilo[triethyltris(3,3'5,5'-tetra-tert-butyl-1,1'-biphenyl-2,2'-diyl)phosphite] (B), bis(2,4-di-t-butylphenyl)octylphosphite, poly(4,4'-{2,2'-dimethyl-5,5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite),

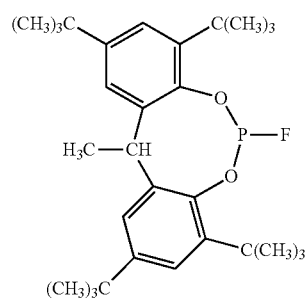
(A)

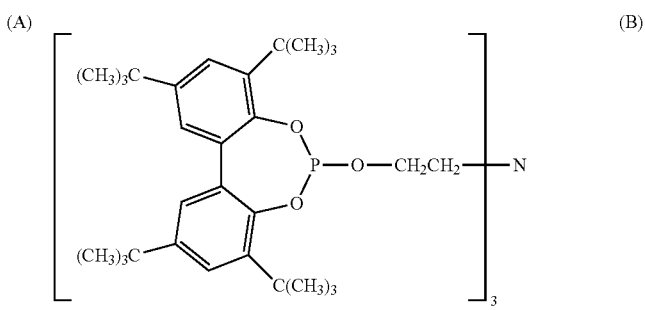
(B)

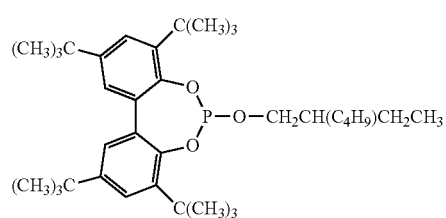
(C)

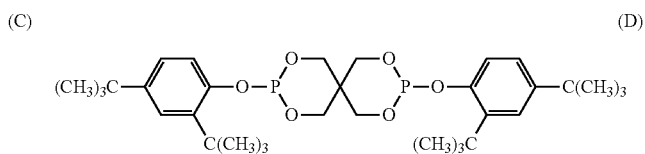
(D)

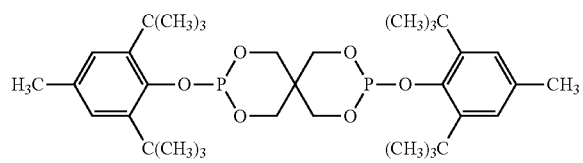
(E)

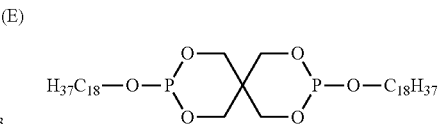
(F)

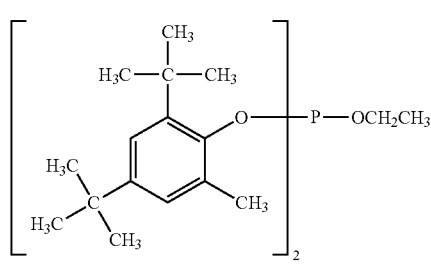
(G)

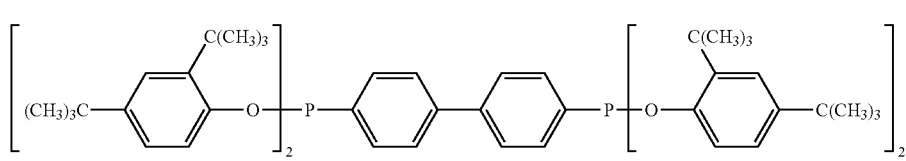
(H)

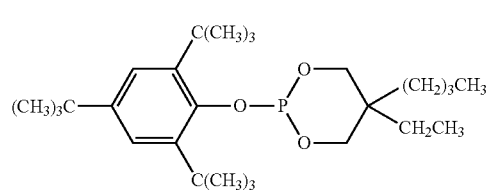
(J)

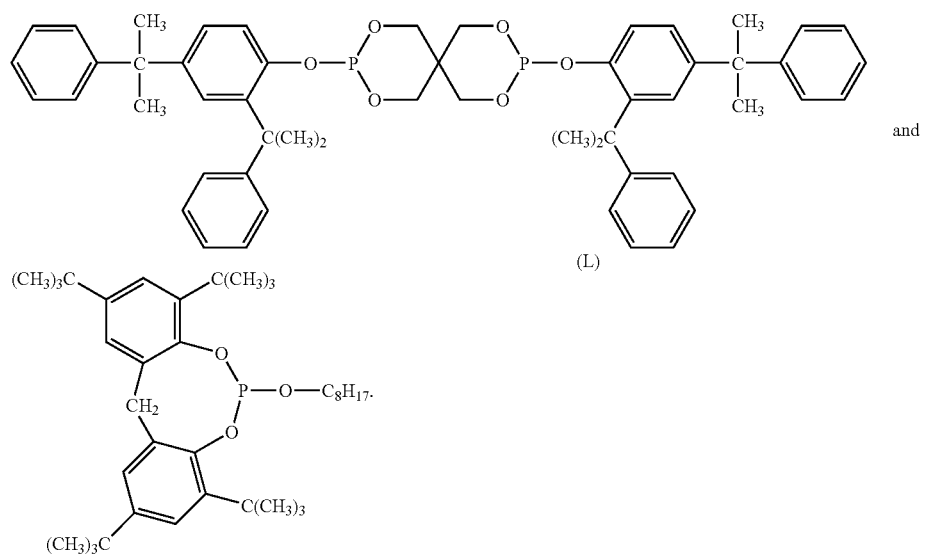

Hindered phenolic antioxidants include for example tris(3,5-di-tert-butyl-4-hydroxybenzyl)isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis[3-(3,5-di-tert-butyl-4-hydroxyphenyl)propionate] or octadecyl 3-(3,5-di-tert-butyl-4-hydroxyphenyl)propionate.

Hindered amine light stabilizers include for example the condensate of 1-(2-hydroxyethyl)-2,2,6,6-tetramethyl-4-hydroxypiperidine and succinic acid,

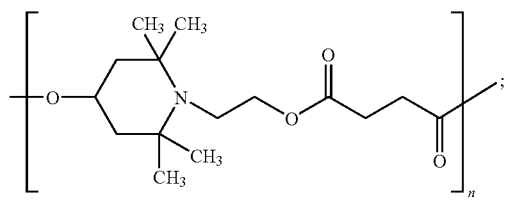

linear or cyclic condensates of N,N'-bis(2,2,6,6-tetramethyl-4-piperidyl)-hexamethylenediamine and 4-tert-octylamino-2,6-dichloro-1,3,5-triazine,

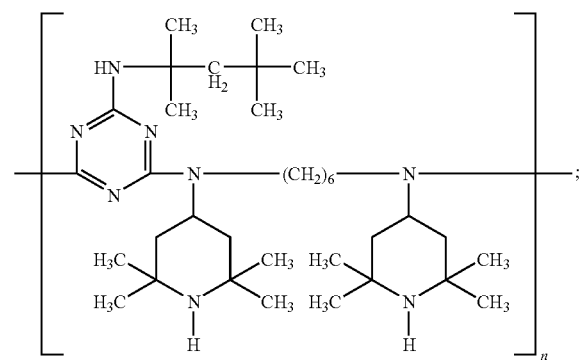

the condensate of 2-chloro-4,6-di-(4-n-butylamino-1,2,2,6,6-pentamethylpiperidyl)-1,3,5-triazine and 1,2-bis-(3-aminopropylamino)ethane,

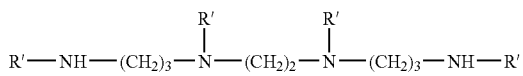

where R' is

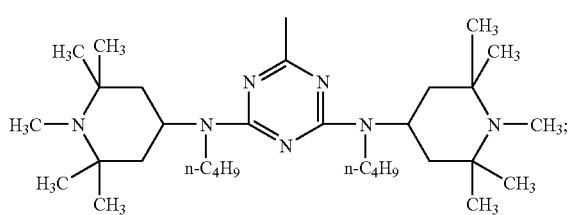

the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,

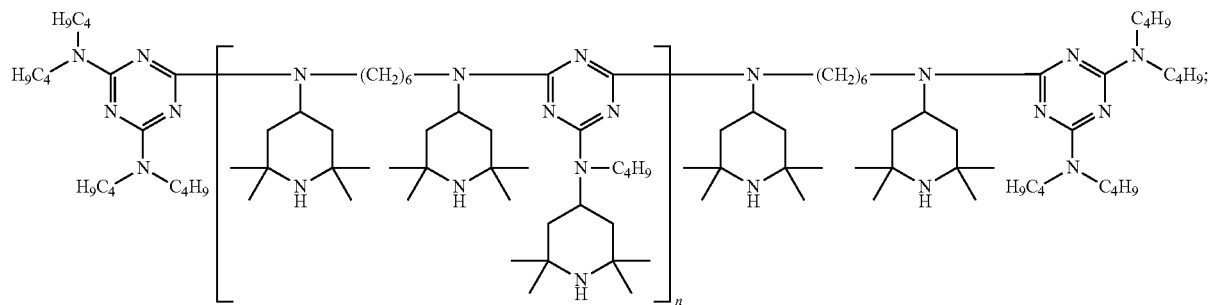

product obtained by reacting a product, obtained by reacting 1,2-bis(3-amino-propylamino)ethane with cyanuric chloride, with (2,2,6,6-tetramethylpiperidin-4-yl)butylamine,

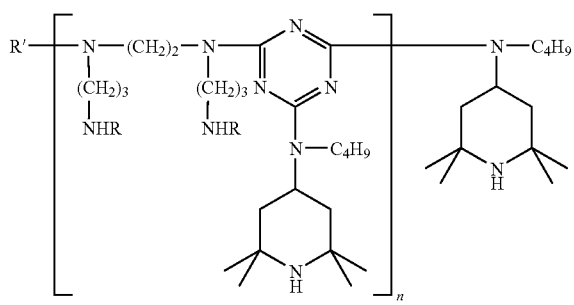

where R'=R or H
and where R=

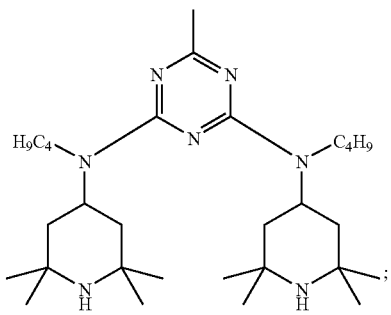

linear or cyclic condensates of N,N'-bis-(2,2,6,6-tetramethyl-4-piperidyl)-hexamethylenediamine and 4-morpholino-2,6-dichloro-1,3,5-triazine,

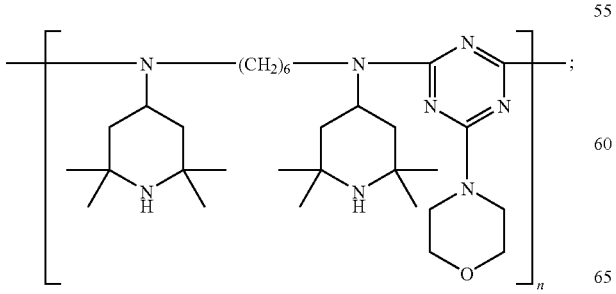

linear or cyclic condensates of N,N'-bis-(1,2,2,6,6-pentamethyl-4-piperidyl)-hexamethylenediamine and 4-morpholino-2,6-dichloro-1,3,5-triazine,

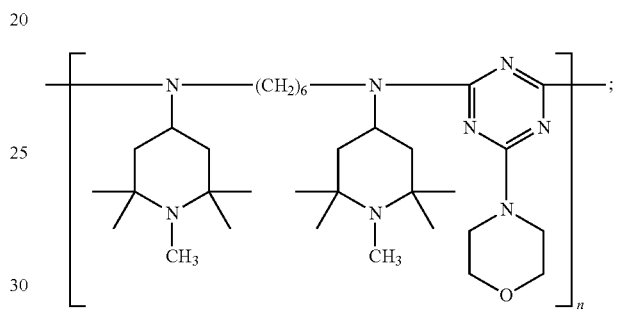

a reaction product of 7,7,9,9-tetramethyl-2-cycloundecyl-1-oxa-3,8-diaza-4-oxospiro[4,5]decane and epichlorohydrin,

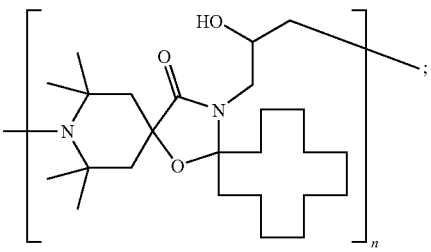

reaction product of maleic acid anhydride-$C_{18}$-$C_{22}$-α-olefin-copolymer with 2,2,6,6-tetramethyl-4-aminopiperidine,

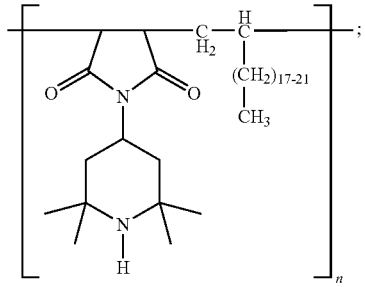

the reaction product of 2,4-bis[(1-cyclohexyloxy-2,2,6,6-piperidin-4-yl)butylamino]-6-chloro-s-triazine with N,N'-bis(3-aminopropyl)ethylenediamine),

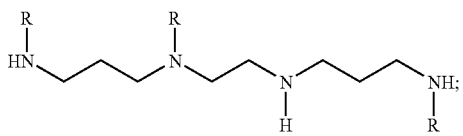

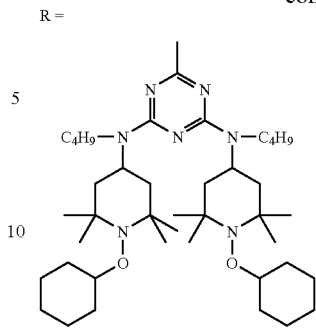

the oligomeric compound which is the condensation product of 4,4'-hexamethylenebis(amino-1-propoxy-2,2,6,6-tetramethylpiperidine) and 2,4-dichloro-6-[(1-propoxy-2,2,6,6-tetramethyl-piperidin-4-yl)butylamino]-s-triazine end-capped with 2-chloro-4,6-bis(dibutylamino)-s-triazine,

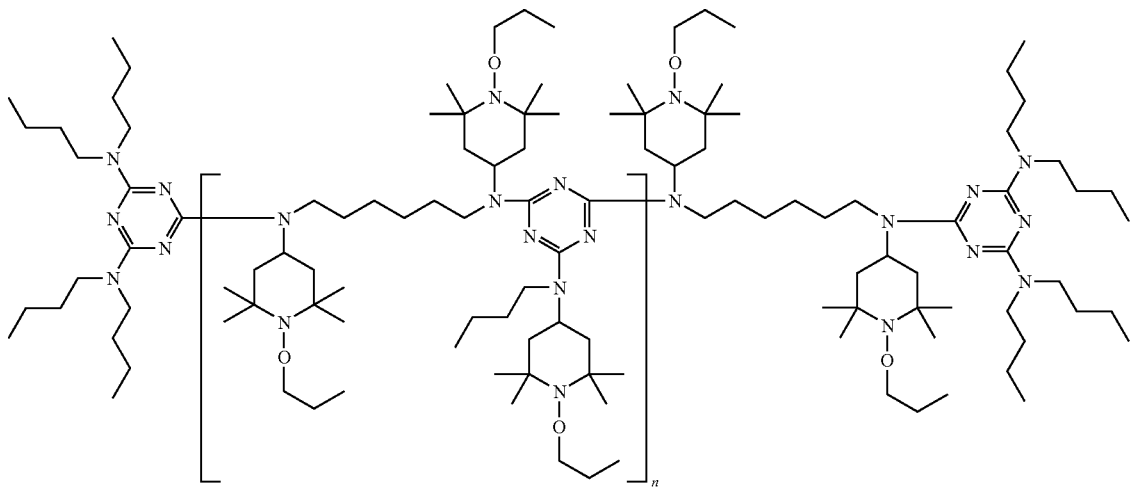

and
the oligomeric compound which is the condensation product of 4,4'-hexamethylenebis(amino-1,2,2,6,6-pentamethylpiperidine) and 2,4-dichloro-6-[(1,2,2,6,6-pentamethylpiperidin-4-yl)butylamino]-s-triazine end-capped with 2-chloro-4,6-bis(dibutylamino)-s-triazine,

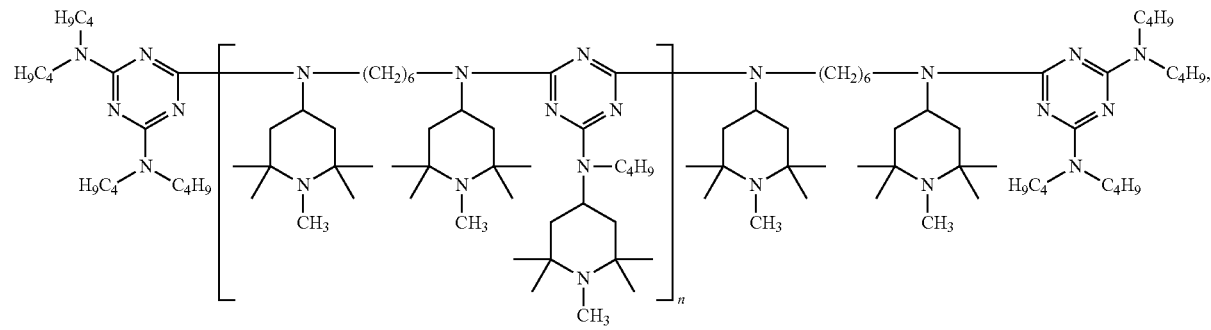

where n is an integer such that the total molecular weight is above about 1000 g/mole.

Hydroxylamine stabilizers are for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or N,N-di(hydrogenated tallow) hydroxylamine.

The amine oxide stabilizer is for example GENOX EP, a di($C_{16}$-$C_{18}$)alkyl methyl amine oxide, CAS#204933-93-7.

Benzofuranone stabilizers are for example 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one or 3-(2,3-dimethylphenyl)-5,7-di-tert-butyl-benzofuran-2-one.

Benzoate UV absorbers are for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Hydroxyphenylbenzotriazole, hydroxyphenyltriazine and benzophenone UV absorbers are well known and are disclosed for instance in U.S. Pat. No. 6,444,733.

The incorporation of the NO-acyl hindered amine compounds and optional further additives into the polyethylene is carried out by known methods, for example before or after molding or also by applying the dissolved or dispersed additive mixture to the polyethylene, with or without subsequent evaporation of the solvent. The NO-acyl hindered amines and optional further additives can also be added to the polyethylene in the form of a masterbatch which contains the additives in a concentration of, for example, about 2.5% to about 25% by weight.

Molding is carried out with known mixing machines, for instance mixers, kneaders or extruders.

The NO-acyl hindered amines and optional further additives can be premixed or added individually.

The NO-acyl hindered amines and optional further additives can also be added before or during the polymerization or before crosslinking.

The NO-acyl hindered amines and optional further additives can be incorporated into the polyethylene to be stabilized in pure form or encapsulated in waxes, oils or polymers.

The NO-acyl hindered amines and optional further additives can also be sprayed onto the polyethylene. They are able to dilute other additives (for example the conventional additives indicated above) or their melts so that they can be sprayed also together with these additives onto the polyethylene. Addition by spraying during the deactivation of the polymerization catalysts is particularly advantageous, it being possible to carry out spraying using, for example, the steam used for deactivation.

During the rotomolding process, the temperature expediently reaches the range from about 200° C. to 400° C., preferably from about 280° C. to 400° C., for example from about 310° C. to 400° C.

The following Examples illustrate the invention in more detail. Parts and percentages are by weight unless indicated otherwise.

Example 1

Preparation of Polyethylene Hollow Articles by the Rotomolding Process 100 parts medium density polyethylene, copolymerized with hexene (nominal melt index 3.5 g/10 min., density 0.935 g/cm$^3$) are dry blended with 0.050 parts of zinc stearate and a combination of further additives. The mixtures are melt compounded into pellets at 232° C. in a Superior/MPM extruder using a 24:1 L/D screw with Maddock mixing head at 100 rpm.

The compounded pellets are ground to a uniform particle size (150-500 µm) prior to the rotational molding process. This grinding step increases the surface area of the particles leading to a faster heat absorption, and thus reducing overall energy consumption.

The rotational molding process is performed in a laboratory scale equipment FSP M20 "Clamshell". The ground resin is placed in a cast aluminum mold, which is rotated biaxially in a gas fired oven. Hot air is circulated by blowers in the chamber while the temperature is increased to 288° C. within 4 minutes. This temperature is maintained for a specific time. Subsequently, the oven is opened and while still rotating, the mold is cooled with forced air circulation for 7 minutes, followed by water spray mist for 7 minutes, and an additional air cooling step for 2 minutes. Throughout the entire heating and cooling cycles, the speed of the major axis is maintained at 6 rpm with a 4.5:1 ratio of rotation. After the cooling cycles, the mold is opened and the hollow object removed.

Formulation A is additionally blended with a combination of 0.100 parts of an organic phosphorus stabilizer, 0.0250 parts of a hydroxylamine process stabilizer and 0.200 parts of a hindered amine stabilizer.

Formulation B is additionally blended with a combination of 0.100 parts of an organic phosphorus stabilizer, 0.0250 parts of a hydroxylamine process stabilizer, 0.00500 parts hindered phenol antioxidant and 0.200 parts of a hindered amine stabilizer.

Formulation C is additionally blended with a combination of 0.2500 parts of a present NO-acyl hindered amine (9), 0.100 parts of an organic phosphorus stabilizer, 0.0250 parts of a hydroxylamine process stabilizer and 0.200 parts of a hindered amine stabilizer.

The organic phosphorus stabilizer is tris(2,4-di-tert-butylphenyl)phosphite. The hydroxylamine is N,N-di(hydrogenated tallow)hydroxylamine. The hindered phenol is 1,2-bis (3,5-di-tert-butyl-4-hydroxyhydrocinnamoyl)hydrazine. The hindered amine stabilizer is

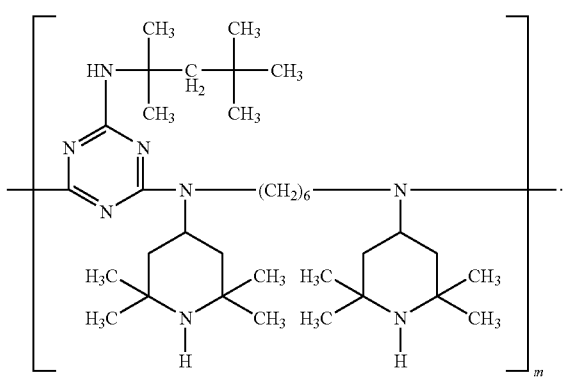

Formulations A-C are rotationally molded into hollow objects according to the general procedure with hold times of 11 to 17 minutes.

Density of the rotomolded part is determined on an air pycromenter, when the part density reaches the full density of polyethylene, 0.935 g/cm³, the part is considered fully cured. Formulation C reaches full density 2 minutes earlier than the comparative Formulations A and B, indicating NO-acyl hindered amines accelerate the heating time in rotomolding. The results are below.

| Time held at 288° C. (min) | Density of Rotomolded Part Formulation | | |
|---|---|---|---|
| | A | B | C |
| 11 | 0.928 | 0.926 | 0.934 |
| 12 | 0.933 | 0.932 | 0.934 |
| 13 | 0.935 | 0.935 | 0.933 |
| 14 | 0.935 | 0.934 | 0.933 |
| 15 | 0.935 | 0.935 | 0.933 |
| 16 | 0.935 | 0.934 | 0.932 |
| 17 | 0.935 | 0.935 | 0.933 |

Low-temperature impact strength testing is performed with an ARM impact tester with a dart of 4.54 kg, with the outside surface facing the dart. Test specimens are conditioned in an air circulated freezer for no less than 24 hours at −40° C. prior to test.

The impact strength results, reported in ft-lb, are below. Formulation C proves to reach the optimum impact strength 2 minutes earlier than the comparative Formulations A and B at these processing conditions.

| Time held at 288° C. (min) | Impact Strength (ft-lb) Formulation | | |
|---|---|---|---|
| | A | B | C |
| 11 | 31.1 | 29.6 | 47.5 |
| 12 | 32.8 | 34.6 | 43.6 |
| 13 | 39.4 | 40.8 | 42.2 |
| 14 | 37.2 | 38.3 | 37.1 |
| 15 | 41.9 | 35.4 | 35.7 |
| 16 | 39.4 | 37.9 | 14.4 |
| 17 | 13.1 | 11.3 | 0.75 |

The stabilizer mixtures of the present invention (Formulation C) can accelerate heating time to reach full density of polyolefin hollow articles produced by the rotomolding process.

What is claimed is:

1. A process for the production of polyethylene hollow articles, which process comprises
charging the polyethylene with one or more NO-acyl hindered amine additives containing one or more groups of formula (I),
filling this mixture into a mold, heating this mold in an oven to above 280° C., such that the additized polyethylene melts,
rotating the mold around at least 2 axes, the additized polyethylene spreading to the walls,
cooling the mold while still rotating,
opening it, and
taking the resultant hollow article out,
where the group of formula (I) is

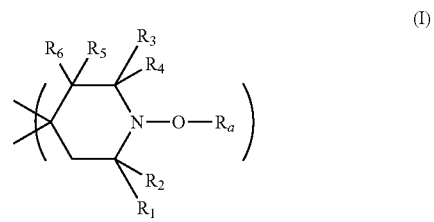

where
$R_a$ is a monoacyl or diacyl radical;
$R_1$-$R_4$ are each $C_1$-$C_6$alkyl; and
$R_5$ and $R_6$ are each, independently of one another, hydrogen, $C_1$-$C_6$alkyl or $C_6$-$C_{10}$aryl; or
$R_5$ and $R_6$ are together oxygen.

2. A process according to claim 1 where in the NO-acyl hindered amines, $R_a$ is —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl or —C(=O)—N($C_1$-$C_6$alkyl)$_2$.

3. A process according to claim 1 where in the NO-acyl hindered amines, $R_a$ is $C_2$-$C_{18}$alkanoyl or $C_3$-$C_6$alkenoyl.

4. A process according to claim 1 where the NO-acyl hindered amines are of the formula

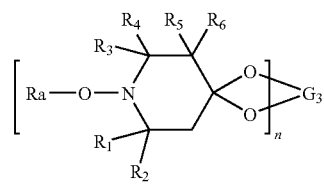

where
n is 1 or 2,
$R_a$ is —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl or —C(=O)—N($C_1$-$C_6$alkyl)$_2$,
$R_1$-$R_4$ are each $C_1$-$C_6$alkyl;

$R_5$ and $R_6$ are each, independently of one another, hydrogen, $C_1$-$C_6$alkyl or $C_6$-$C_{10}$aryl; or $R_5$ and $R_6$ are together oxygen; and
$G_3$ is $C_2$-$C_8$alkylene, $C_2$-$C_8$hydroxyalkylene or $C_4$-$C_{30}$acyloxyalkylene when n=1 or is the group (—CH$_2$)$_2$C(CH$_2$—)$_2$ when n=2.
5. A process according to claim 1 where the NO-acyl hindered amines are of formulae (1)-(9):
(1)
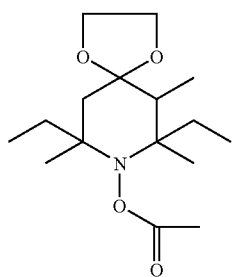
(2)
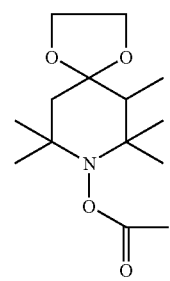
(3)
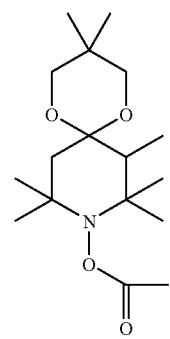
(4)
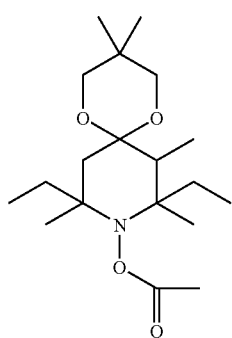
(5)
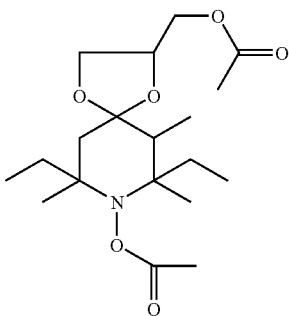
(6)
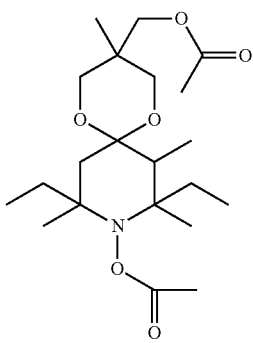
(7)
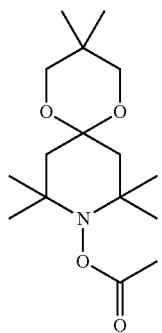
(8)
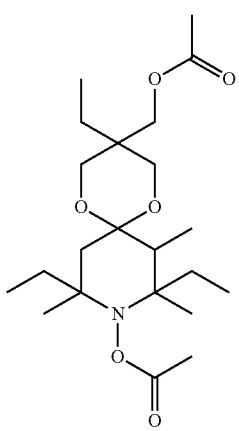

(9)

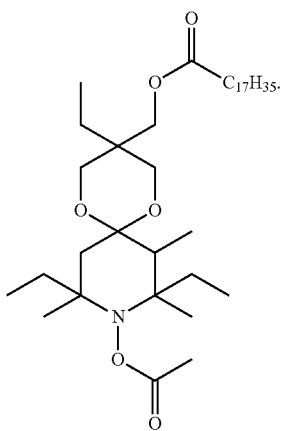

6. A process according to claim 1 where the mold is heated in an oven to above 285° C.

7. A process according to claim 1 where the mold is heated in an oven to above 300° C.

8. A process according to claim 1 where the NO-acyl hindered amines are present from about 0.1 to about 1.0 percent by weight, based on the weight of the polyethylene.

9. A process according to claim 1 where the NO-acyl hindered amines are present from about 0.1 to about 0.5 weight percent, based on the weight of the polyethylene.

10. A process according to claim 1 comprising charging the polyethylene with further additives selected from hydroxyphenylbenzotriazole, hydroxyphenyltriazine, benzophenone or benzoate UV absorbers, organic phosphorus stabilizers, hydroxylamine stabilizers, benzofuranone stabilizers, amine oxide stabilizers, hindered phenol antioxidants and further hindered amine stabilizers.

11. A process according to claim 1 comprising charging the polyethylene with further additives selected from organic phosphorus stabilizers, hydroxylamine stabilizers, hindered phenol antioxidants, benzoate UV absorbers and further hindered amine stabilizers.

12. A process according to claim 1 comprising charging the polyethylene with further additives selected from triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris (2,4-di-tert-butylphenyl)phosphite, bis(2,4-di-α-cumylphenyl)pentaerythritol diphosphite, diisodecyl pentaerythritol diphosphite, bis(2,4-di-tert-butylphenyl)pentaerythritol diphosphite (D), bis(2,6-di-tert-butyl-4-methylphenyl)pentaerythritol diphosphite (E), bisisodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2] dioxaphosphocin (A), bis(2,4-di-tert-butyl-6-methylphenyl) methyl phosphite, bis(2,4-di-tert-butyl-6-methylphenyl) ethyl phosphite (G), 2,2',2''-nitrilo[triethyltris(3,3'5,5'-tetra-tert-butyl-1,1'-biphenyl-2,2'-diyl)phosphite] (B), bis(2,4-di-t-butylphenyl)octylphosphite, poly(4,4'-{2,2'-dimethyl-5,5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite), (A)

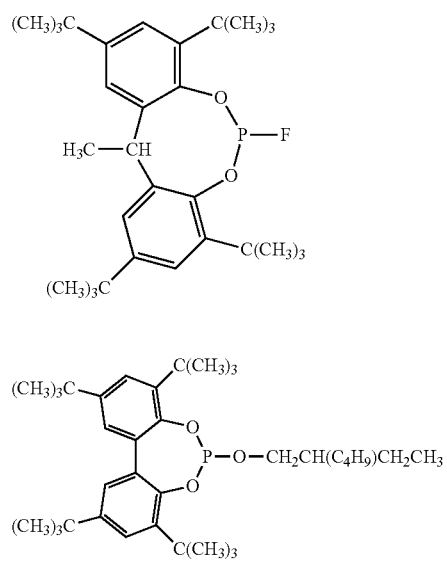

(B)

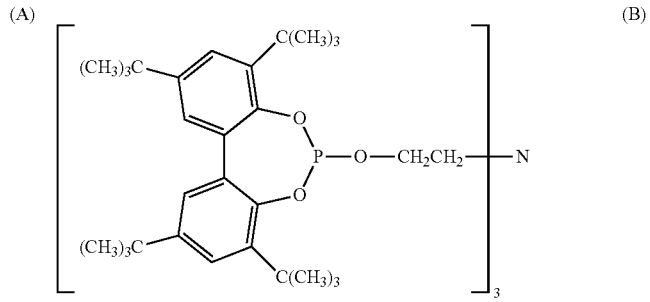

(C)

(D)

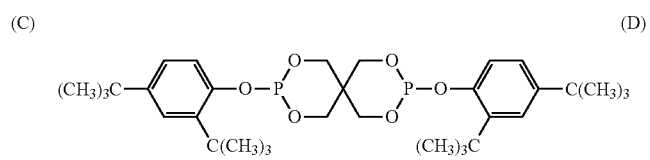

(E)

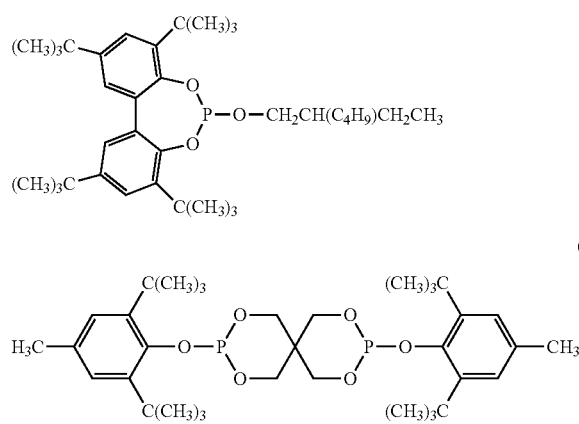

(F)

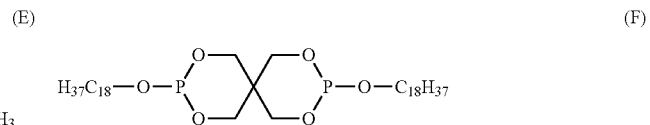

-continued

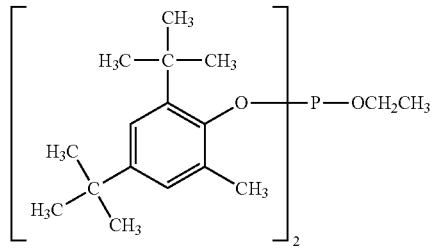
(G)

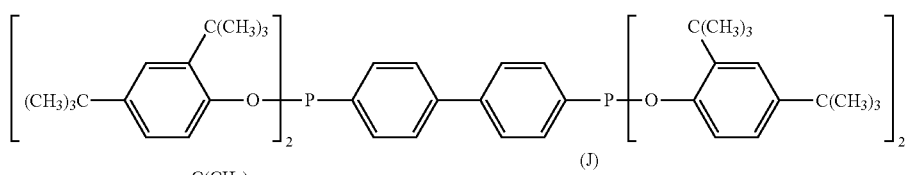
(H)

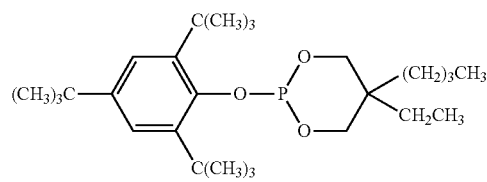
(J)

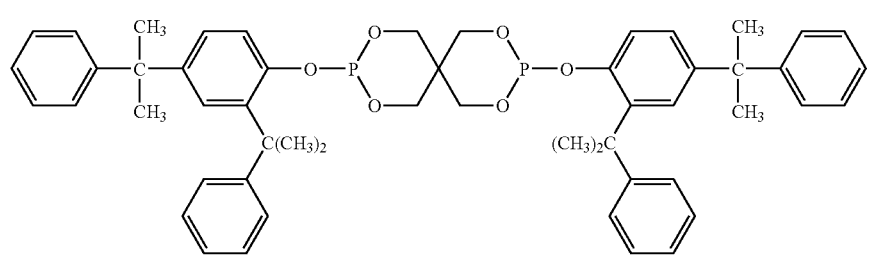
(K)

and

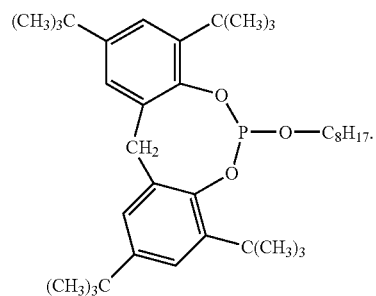
(L)

13. A process according to claim 1 comprising charging the polyethylene with further additives selected from N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow) hydroxylamine.

14. A process according to claim 1 comprising charging the polyethylene with further additives selected from tris(3,5-di-tert-butyl-4-hydroxybenzyl)isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis[3-(3,5-di-tert-butyl-4-hydroxyphenyl)propionate], octadecyl 3-(3,5-di-tert-butyl-4-hydroxyphenyl)propionate and 1,2-bis (3,5-di-tert-butyl-4-hydroxyhydrocinnamoyl)hydrazine.

15. A process according to claim 1 comprising charging the polyethylene with further additives selected from the condensate of 1-(2-hydroxyethyl)-2,2,6,6-tetramethyl-4-hydroxypiperidine and succinic acid,

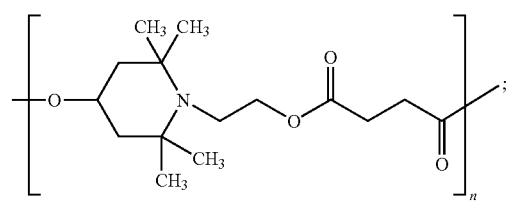

linear or cyclic condensates of N,N'-bis(2,2,6,6-tetramethyl-4-piperidyl)-hexamethylenediamine and 4-tert-octylamino-2,6-dichloro-1,3,5-triazine,

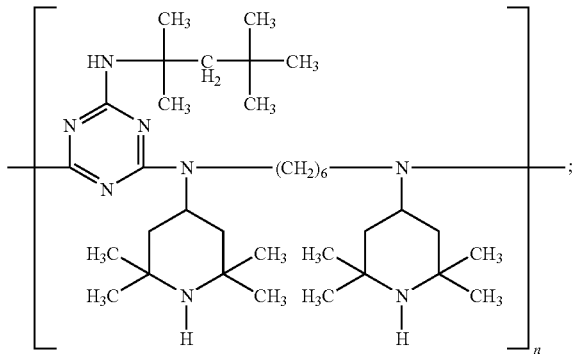

the condensate of 2-chloro-4,6-di-(4-n-butylamino-1,2,2,6,6-pentamethylpiperidyl)-1,3,5-triazine and 1,2-bis-(3-aminopropylamino)ethane,

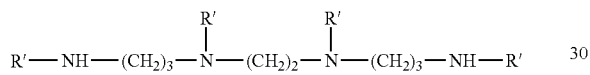

where R' is

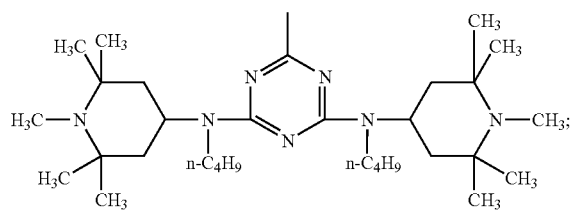

the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine, product obtained by reacting a product, obtained by reacting 1,2-bis(3-amino-propylamino)ethane with cyanuric chloride, with (2,2,6,6-tetramethylpiperidin-4-yl)butylamine,

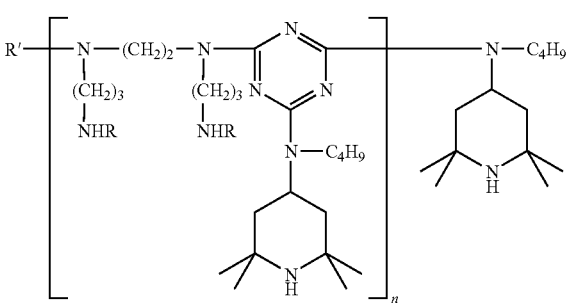

where R'=R or H
and where R=

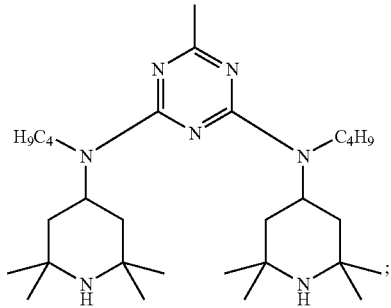

linear or cyclic condensates of N,N'-bis-(2,2,6,6-tetramethyl-4-piperidyl)-hexamethylenediamine and 4-morpholino-2,6-dichloro-1,3,5-triazine,

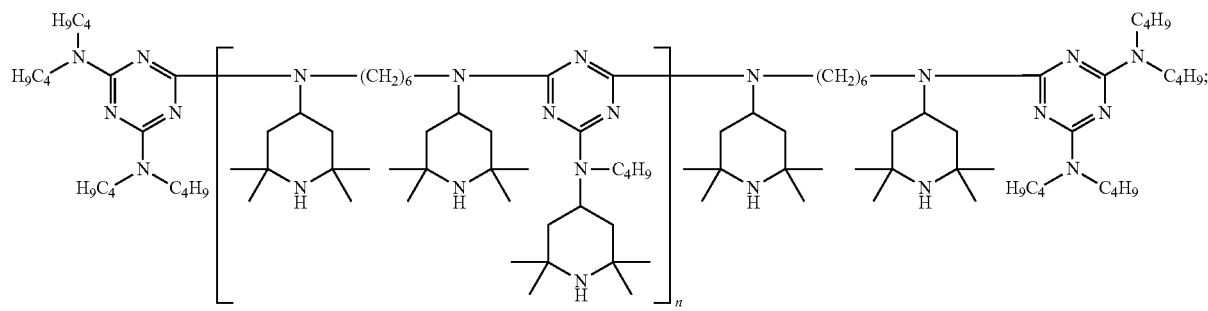

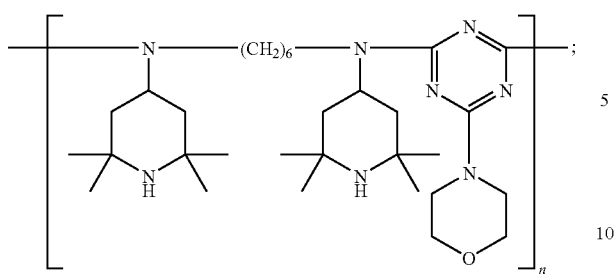

linear or cyclic condensates of N,N'-bis-(1,2,2,6,6-pentamethyl-4-piperidyl)-hexamethylenediamine and 4-morpholino-2,6-dichloro-1,3,5-triazine,

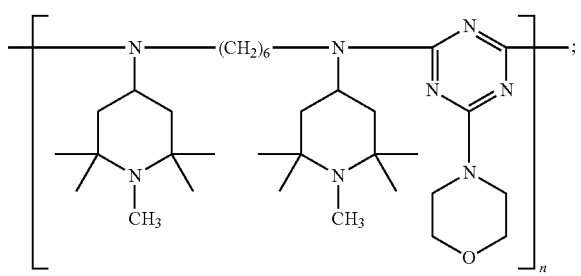

a reaction product of 7,7,9,9-tetramethyl-2-cycloundecyl-1-oxa-3,8-diaza-4-oxospiro[4,5]decane and epichlorohydrin,

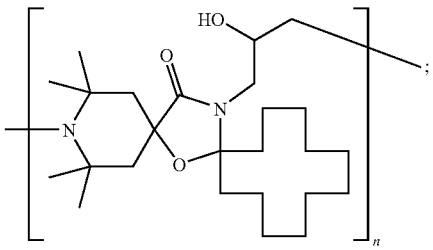

reaction product of maleic acid anhydride-$C_{18}$-$C_{22}$-α-olefin-copolymer with 2,2,6,6-tetramethyl-4-aminopiperidine,

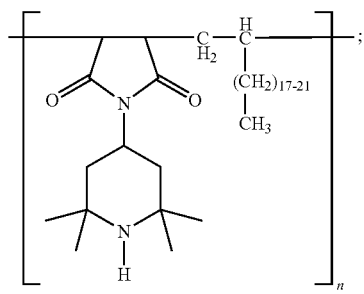

the reaction product of 2,4-bis[(1-cyclohexyloxy-2,2,6,6-piperidin-4-yl)butylamino]-6-chloro-s-triazine with N,N'-bis(3-aminopropyl)ethylenediamine),

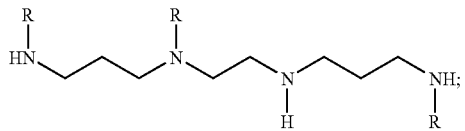

R = 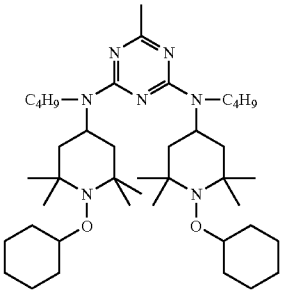

the oligomeric compound which is the condensation product of 4,4'-hexamethylenebis(amino-1-propoxy-2,2,6,6-tetramethylpiperidine) and 2,4-dichloro-6-[(1-propoxy-2,2,6,6-tetramethyl-piperidin-4-yl)butylamino]-s-triazine end-capped with 2-chloro-4,6-bis(dibutylamino)-s-triazine,

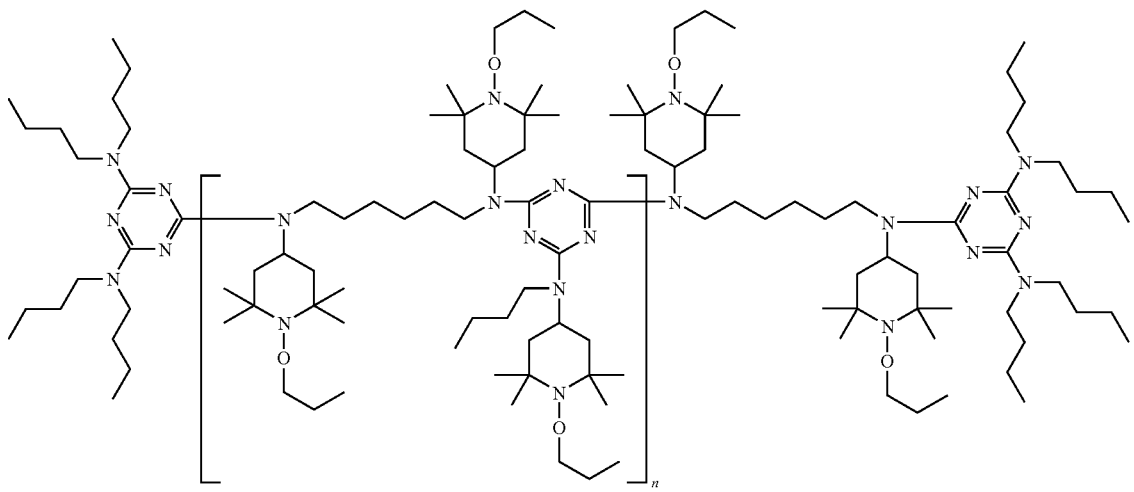

and
the oligomeric compound which is the condensation product of 4,4'-hexamethylenebis(amino-1,2,2,6,6-pentamethylpiperidine) and 2,4-dichloro-6-[(1,2,2,6,6-pentamethylpiperidin-4-yl)butylamino]-s-triazine end-capped with 2-chloro-4,6-bis(dibutylamino)-s-triazine,

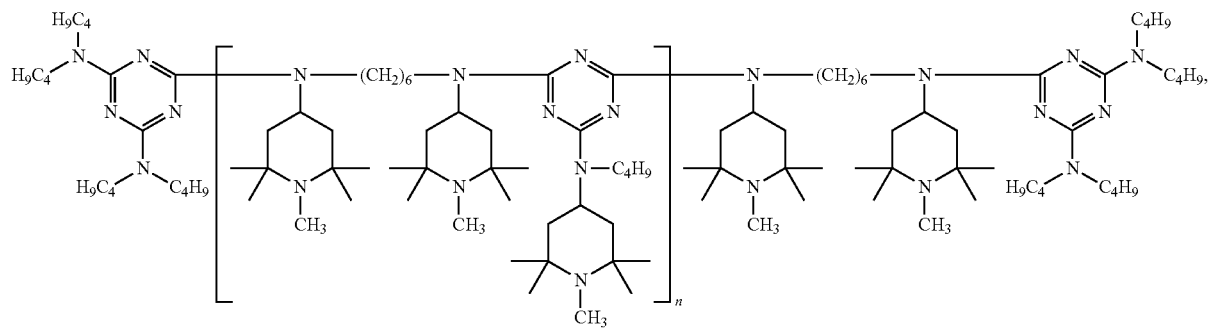

where n is an integer such that the total molecular weight is above about 1000 g/mole.

16. A process according to claim 1 comprising charging the polyethylene with further additives selected from 2,4-di-tert-butylphenyl 3,5-di-tert-butyl-4-hydroxybenzoate and hexadecyl 3,5-di-tert-butyl-4-hydroxybenzoate.

17. A process according to claim 1 where the polyethylene is high density polyethylene (HDPE), high molecular weight high density polyethylene (HMW HDPE), ultrahigh molecular weight high density polyethylene (UHMW HDPE), medium density polyethylene (MDPE), low density polyethylene (LDPE), linear low density polyethylene (LLDPE), branched low density polyethylene (BLDPE) or polyethylenes or ethylene copolymers prepared using Phillips catalysts and polyethylene blends.

18. A process according to claim 1 where the polyethylene is further charged with an organic phosphorus stabilizer, a hydroxylamine stabilizer and a hindered amine stabilizer.

19. A process according to claim 18, where
the organic phosphorus stabilizer is selected from the group consisting of triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl) phosphite, bis(2,4-di-α-cumylphenyl) pentaerythritol diphosphite, diisodecyl pentaerythritol diphosphite, bis(2,4-di-tert-butylphenyl)pentaerythritol diphosphite (D), bis(2,6-di-tert-butyl-4-methylphenyl) pentaerythritol diphosphite (E), bisisodecyloxy-pentaerythritol diphosphite, bis(2,4-di-tert-butyl-6-methylphenyl)pentaerythritol diphosphite, bis(2,4,6-tri-tert-butylphenyl) pentaerythritol diphosphite, tristearyl sorbitol triphosphate, tetrakis (2,4-di-tert-butylphenyl) 4,4'-biphenylene-diphosphonate (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2]dioxaphosphocin (A), bis(2,4-di-tert-butyl-6-methylphenyl)methyl phosphite, bis(2,4-di-tert-butyl-6-methylphenyl)ethyl phosphite (G), 2,2',2"-nitrilo[triethyltris(3,3'5,5'-tetra-tert-butyl-1,1'-biphenyl-2,2'-diyl)phosphite] (B), bis(2,4-di-t-butylphenyl)octylphosphite, poly(4,4'-{2,2'-dimethyl-5,5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite), (A)

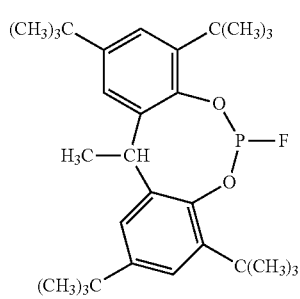

-continued
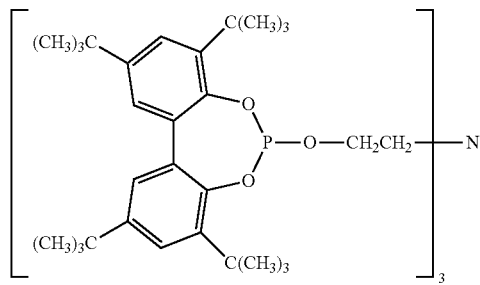
(B)
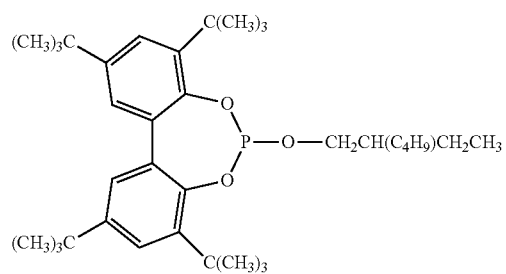
(C)
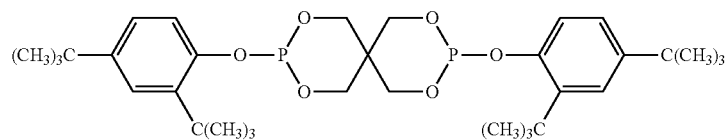
(D)
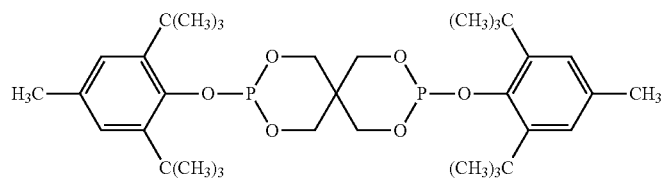
(E)
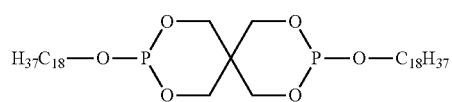
(F)
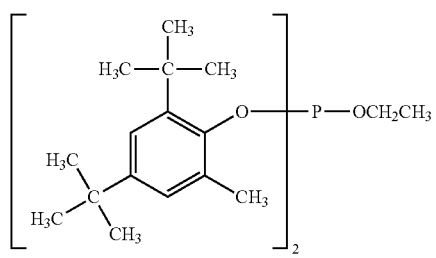
(G)
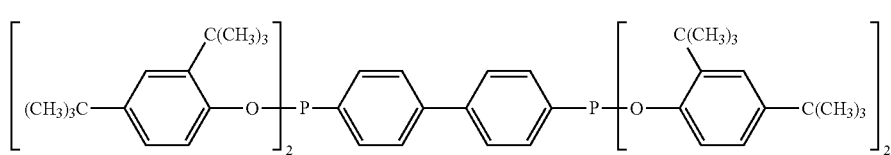
(H)
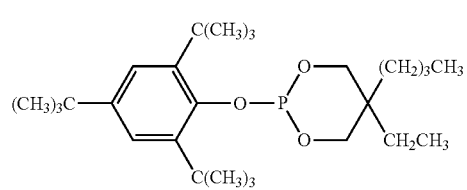
(J)

-continued

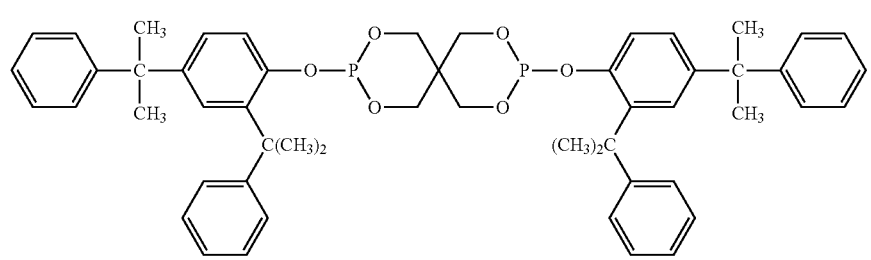
(K)

and

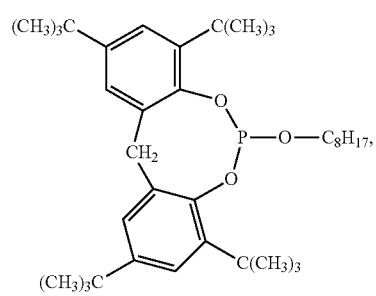
(L)

the hydroxylamine stabilizer is selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow)hydroxylamine and the hindered amine stabilizer is selected from the group consisting of the condensate of 1-(2-hydroxyethyl)-2,2,6,6-tetramethyl-4-hydroxypiperidine and succinic acid,

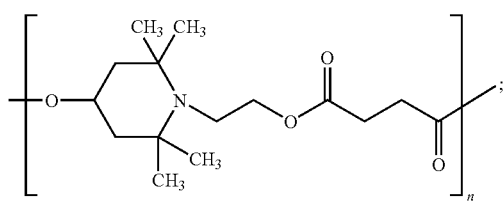

linear or cyclic condensates of N,N'-bis(2,2,6,6-tetramethyl-4-piperidyl)-hexamethylenediamine and 4-tert-octylamino-2,6-dichloro-1,3,5-triazine,

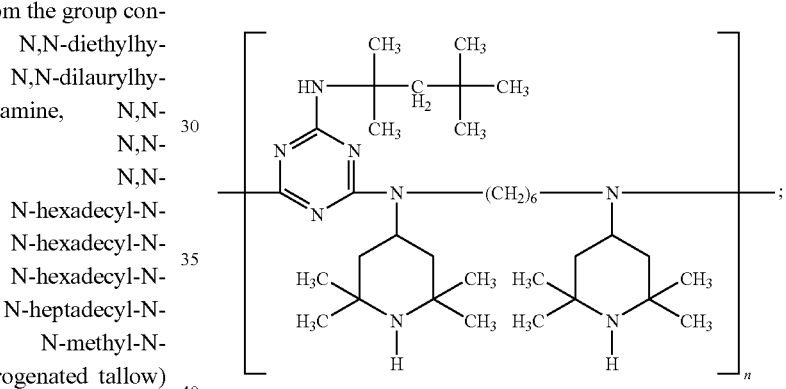

the condensate of 2-chloro-4,6-di-(4-n-butylamino-1,2,2,6,6-pentamethylpiperidyl)-1,3,5-triazine and 1,2-bis-(3-aminopropylamino)ethane,

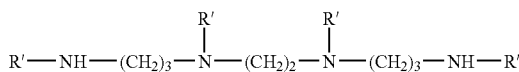

where R' is

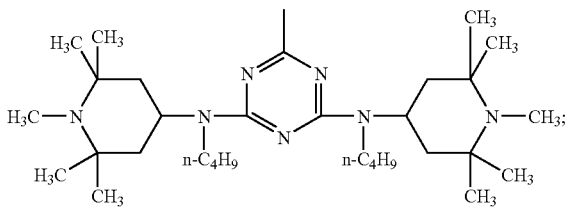

the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,

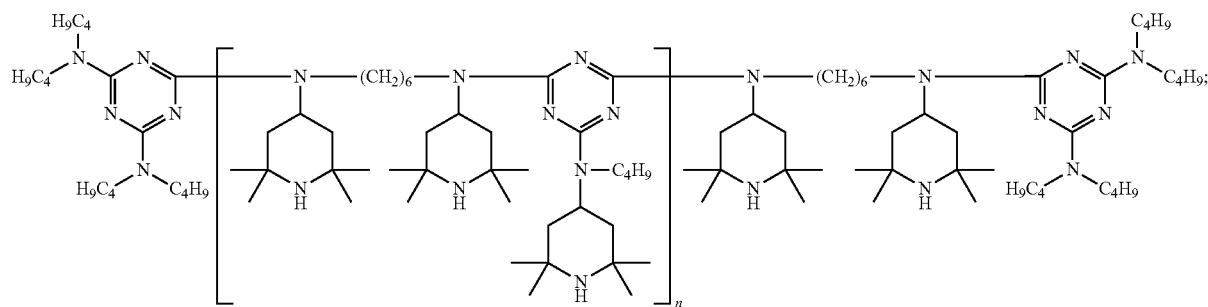

product obtained by reacting a product, obtained by reacting 1,2-bis(3-amino-propylamino)ethane with cyanuric chloride, with (2,2,6,6-tetramethylpiperidin-4-yl)butylamine,

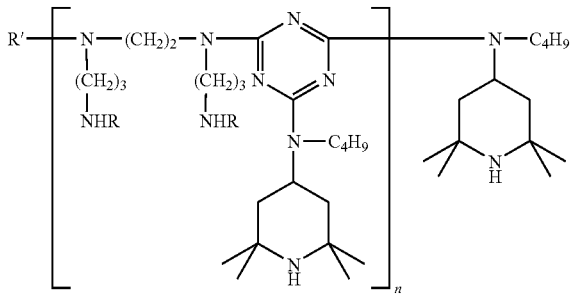

where R'=R or H
and where R=

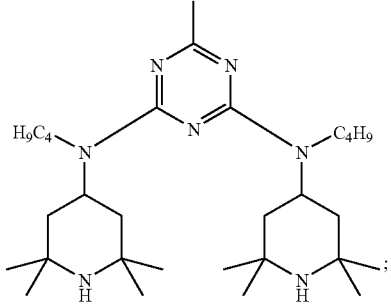

linear or cyclic condensates of N,N'-bis-(2,2,6,6-tetramethyl-4-piperidyl)-hexamethylenediamine and 4-morpholino-2,6-dichloro-1,3,5-triazine,

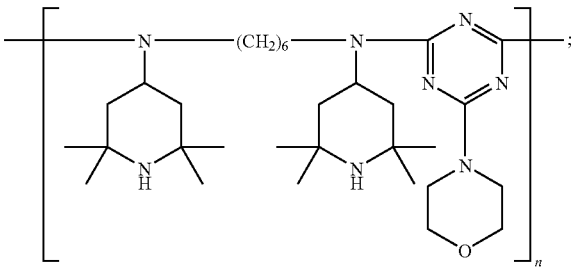

linear or cyclic condensates of N,N'-bis-(1,2,2,6,6-pentamethyl-4-piperidyl)-hexamethylenediamine and 4-morpholino-2,6-dichloro-1,3,5-triazine,

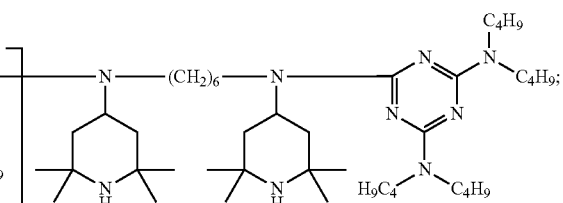

a reaction product of 7,7,9,9-tetramethyl-2-cycloundecyl-1-oxa-3,8-diaza-4-oxospiro[4,5]decane and epichlorohydrin,

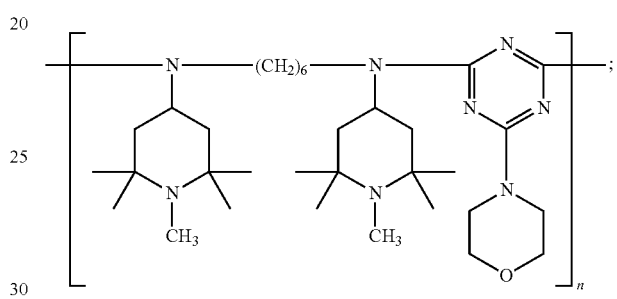

reaction product of maleic acid anhydride-$C_{18}$-$C_{22}$-α-olefin-copolymer with 2,2,6,6-tetramethyl-4-aminopiperidine,

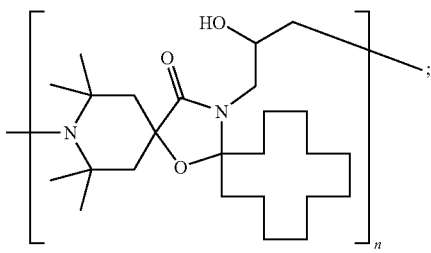

the reaction product of 2,4-bis[(1-cyclohexyloxy-2,2,6,6-piperidin-4-yl)butylamino]-6-chloro-s-triazine with N,N'-bis(3-aminopropyl)ethylenediamine),

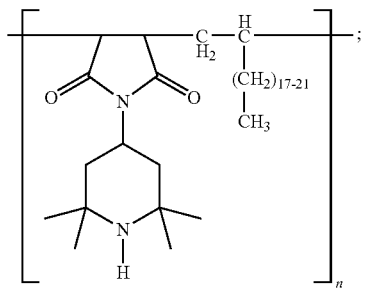

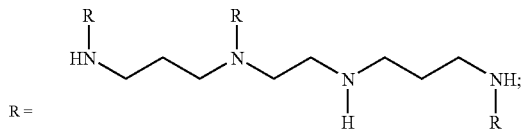

R =

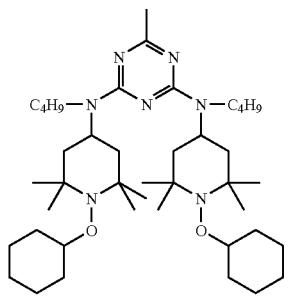

the oligomeric compound which is the condensation product of 4,4'-hexamethylenebis(amino-1-propoxy-2,2,6,6-tetramethylpiperidine) and 2,4-dichloro-6-[(1-propoxy-2,2,6,6-tetramethyl-piperidin-4-yl)butylamino]-s-triazine end-capped with 2-chloro-4,6-bis(dibutylamino)-s-triazine,

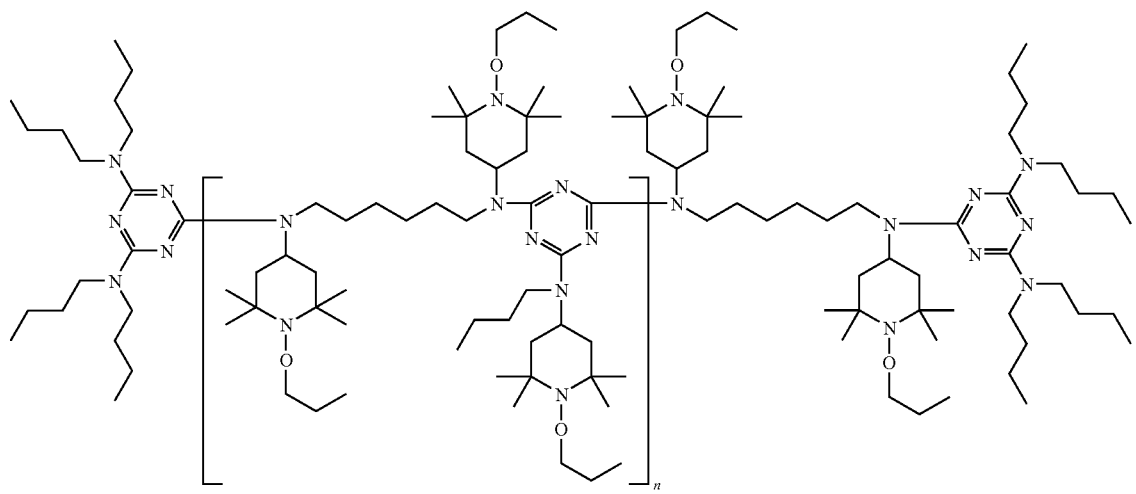

and the oligomeric compound which is the condensation product of 4,4'-hexamethylenebis(amino-1,2,2,6,6-pentamethylpiperidine) and 2,4-dichloro-6-[(1,2,2,6,6-pentamethylpiperidin-4-yl)butylamino]-s-triazine end-capped with 2-chloro-4,6-bis(dibutylamino)-s-triazine,

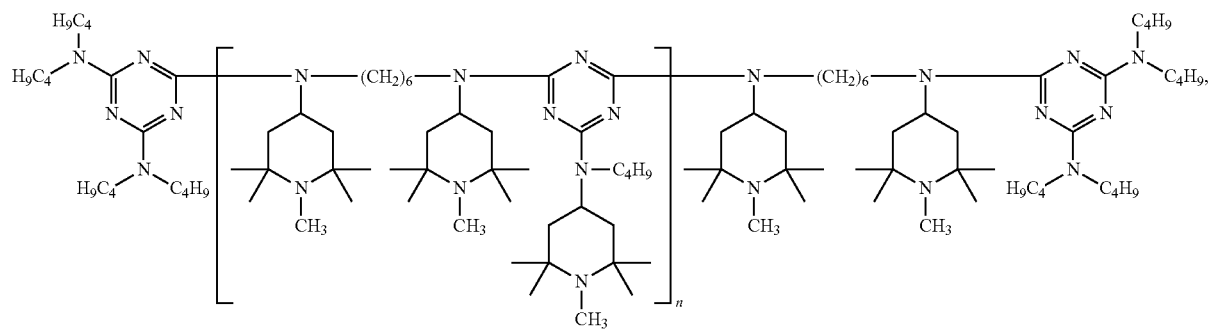

where n is an integer such that the total molecular weight is above about 1000 g/mole.

* * * * *